July 29, 1969

D. L. G. YOUNG 3,458,038

SCREENING APPARATUS

Filed June 2, 1966

INVENTOR.
DOUGLAS L.G. YOUNG
BY
ATTORNEY

July 29, 1969  D. L. G. YOUNG  3,458,038
SCREENING APPARATUS

Filed June 2, 1966  2 Sheets-Sheet 2

INVENTOR.
DOUGLAS L.G. YOUNG
BY
ATTORNEY

United States Patent Office 3,458,038
Patented July 29, 1969

3,458,038
SCREENING APPARATUS
Douglas L. G. Young, Pierrefonds, Quebec, Canada, assignor to Canadian Ingersoll-Rand Company Limited, Montreal, Quebec, Canada
Filed June 2, 1966, Ser. No. 554,826
Int. Cl. D21d 5/06
U.S. Cl. 209—3          16 Claims

ABSTRACT OF THE DISCLOSURE

A pulp screening apparatus comprising an annular screen having baffles at its opposite ends, and a rotor which extends along the screen and baffles with its opposing ends projecting beyond the baffles. The rotor is spaced from the screen and baffles by an annular fluid passage; and the rotor and one of the baffles are opposed along the fluid passage a distance sufficient that pulp supplied therebetween is rotated by the rotor to screening velocity prior to passing between the screen and rotor. In addition, the rotor and the other baffle are opposed along the fluid passage a distance sufficient that debris discharged therebetween is prevented from slowing the flow between the screen and rotor.

---

This invention relates generally to apparatus for screening fluids comprising mixtures of fibrous material and liquid and has more particular reference to apparatus for screening paper making pulps or slurries to remove coarse material such as fiber bundles, known as shives or slivers, and other debris.

Recently, an apparatus has been developed for screening paper making pulp by passing it through a fluid passage provided axially between a screen plate which contains a plurality of screening apertures and a rotating working member. In the operation of this apparatus, the fiber in the paper making pulp suitable for the paper making process is accepted by the apertures in the screen plate. The coarse material in the paper making pulp, such as fiber bundles and other debris, is rejected by the screen plate apertures, and passes longitudinally through the fluid passage. This apparatus is disclosed in U.S. patent application Ser. No. 363,438, which was filed Apr. 29, 1964, by Ian J. H. Clarke-Pounder, and now U.S. Patent No. 3,363,759, issued Jan. 16, 1968.

It is believed that, in the operation of screening apparatus of this type, certain conditions are essential for the fiber accepted by the screen plate apertures to attain maximum freedom from coarse material and, hence, the apparatus to attain maximum screening efficiency. One of these conditions is that the fiber bundles and other coarse material must be disposed adjacent the screen plate in random orientation in a plane parallel to the plane of the longitudinal axis of the screen plate. This condition is believed to be satisfied by centrifugal force generated by the rotation of the rotating working member.

A second of these conditions is that the paper making pulp must be maintained at a substantially constant, relatively high, axial velocity throughout its passage adjacent to the screen plate. This condition is of paramount importance inasmuch as the quantity of coarse material accepted by the screen plate apertures is greatly dependent upon the length of the time period during which the coarse material is presented to the screen plate apertures. That is, the longer the time period during which the coarse material is presented to the screen plate apertures, the greater the opportunity afforded smaller particles of the coarse material to sufficiently align themselves with the apertures to pass through the apertures. Conversely, the shorter the time period during which the coarse material is presented to the screen plate apertures, the less opportunity afforded each smaller particle of the coarse material for sufficiently aligning itself with any one of the apertures to pass therethrough. Thus, the velocity of the paper making pulp in the fluid passage of this apparatus is of prime importance in determining the freedom of the accepted stock from coarse material.

The construction of this apparatus, as disclosed in the beforementioned patent application, can provide the paper making pulp flowing along the screen plate with a sometimes undesirably slow velocity. More specifically, the paper making pulp is substantially immediately introduced into the fluid passage adjacent the screen apertures. Thus, the paper making pulp is initially rotated by the rotating working member while substantially being screened by the screen plate apertures. Also, after the paper making pulp has passed along a portion of the screen plate, its axial velocity may diminish due to the cumulative effects of the passage of more liquid paper making pulp through the screen plate apertures. Furthermore, the paper making pulp discharged from the bottom of the fluid passage with the concentrated coarse material rejected by the screen plate apertures produces a waterfall effect which can slow the axial velocity of the paper making pulp adjacent the screen plate apertures. This waterfall effect occurs as the paper making pulp adjacent to the rotating working member flows across the fluid passage immediately adjacent the screen plate apertures upon its discharge from the fluid passage, thereby slowing the paper making pulp adjacent the screen plate apertures. Thus, the apparatus, as disclosed in the beforementioned patent application, can furnish the paper making pulp, particularly adjacent the apertures in the opposing ends of the screen plate, with a variable, sometimes undesirably slow velocity.

An object of the present invention is to provide a new and improved screening apparatus of the type set forth which is particularly constructed and arranged to provide the paper making pulp with a substantially constant, relatively high axial velocity during its flow along the screen plate apertures, and, thereby, to provide the fiber accepted by the screen plate apertures with maximum freedom from coarse material.

Another object of the invention is to provide a new and improved screening apparatus of the type set forth which is particularly constructed and arranged to provide the paper making pulp with the substantially constant, relatively high axial velocity prior to its presentation to the screen plate apertures such that the paper making pulp, when presented to the screen plate apertures, has attained such substantially constant, relatively high, axial velocity.

Another object is to provide a new and improved screening apparatus of the type set forth which is particularly constructed and arranged to maintain the substantially constant, relatively high axial velocity of the paper making pulp throughout the flow of the latter adjacent to the screen plate apertures.

Another object is to provide a new and improved screening apparatus of the type set forth which is particularly constructed and arranged to prevent the flow of the coarse material which is rejected by the screen plate apertures from substantially interfering with the substantially constant, relatively high axial velocity of the paper making pulp adjacent to the screen plate apertures.

In general, the foregoing objects, and the other objects and advantages of the invention which will be apparent from the following description taken in connection with the accompanying drawings, are obtained by the provision of an apparatus for screening paper making pulp, comprising a screen having openings adapted for accepting acceptable fiber and rejecting debris. A baffle disposed adjacent one end of the screen cooperates with the latter to form one wall of a fluid passage; and a rotatably driven wall member extends along the screen and baffle in spaced relation thereto to form an opposing wall of the fluid passage and has an end portion projecting beyond the baffle. An inlet means communicates with the fluid passage for supplying pulp thereto between the baffle and the wall member, the baffle and wall member being opposed along the fluid passage a distance sufficient that pulp supplied by the inlet means is rotated by the wall member to screening velocity while between the baffle and wall member and prior to passing between the screen and wall member. An accepts outlet means is provided for discharging acceptable fiber accepted by the openings in the screen; and a rejects outlet means communicates with the fluid passage for discharging debris rejected by the openings in the screen.

Preferably, furthermore, a fluid conduit means extends through the screen for introducing dilution liquid into the fluid passage, and the irregular surface of the rotary wall member opposite the screen is formed to increase the velocity of the paper making pulp flowing through the fluid passage immediately prior to the introduction into the fluid passage of the dilution liquid.

Preferably, furthermore, the rejects outlet means communicates with the fluid passage adjacent the end of the screen opposite to that adjacent the baffle, and a second baffle projects beyond said opposing end of the screen to form a longitudinal extension of the screen adjacent the communication of the rejects outlet means with the fluid passage, such second baffle opposing the wall member a distance sufficient to prevent debris discharged to the rejects outlet means from slowing the flow of material between the screen and wall member.

Referring to the drawings.

Figure 1:
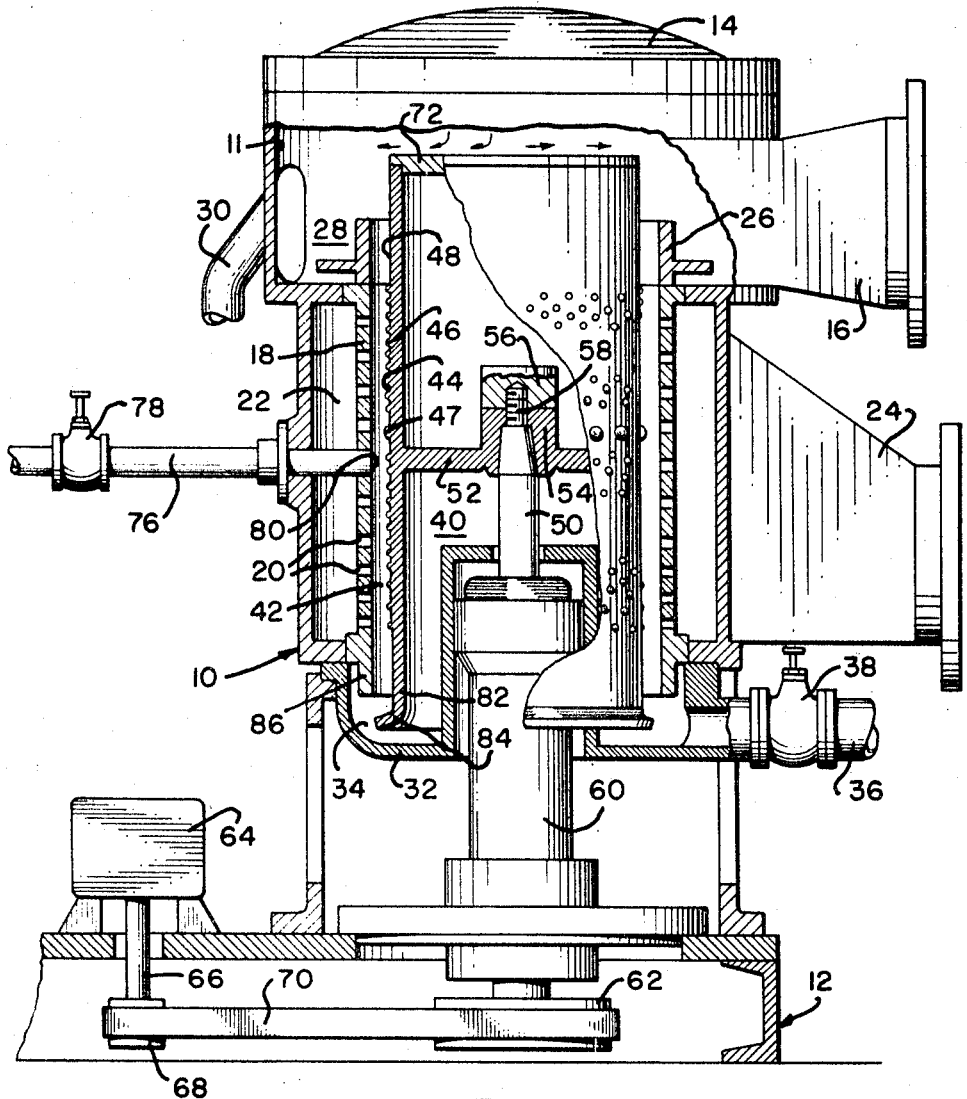
FIG. 1 is an elevational view, partially broken away and in section, of a screening apparatus constructed in accordance with the present invention.

Referring more particularly to the drawings wherein similar reference characters designate corresponding parts throughout the several views, the embodiment of the screening apparatus illustrated in FIG. 1 comprises a vertically extending, pressurized casing 10 which is supported by a horizontally extending, ground mounted base 12. The casing 10 is closed at its upper end by a detachable, pressure dome 14 and includes a tangential inlet conduit 16 adjacent its upper end. The inlet conduit 16, during the operation of the screening apparatus, is connected to a source (not shown) of the paper making pulp to be screened and directs such paper making pulp tangentially into the upper end of the casing 10.

A vertically extending, cylindrical screen plate 18, having a plurality of screening apertures or openings 20, is disposed within the casing 10 below the inlet conduit 16. The screen plate 18 is suitably spaced from the walls of the casing 10 to provide an annular, volute shaped accepts chamber 22 between the screen plate 18 and the walls of the casing 10. The casing 10 includes a tangential, accepts outlet conduit 24 which communicates with the accepts chamber 22 and, during the operation of the screening apparatus, discharges from the casing 10 paper making fiber passing through the screen plate 18 into the accepts chamber 22.

A vertically extending, cylindrical baffle plate 26, having a radius substantially that of the screen plate 18, is disposed above the screen plate 18 and is coaxial with the latter. The baffle plate 26 is generally imperforate and is formed with a smooth, regular surface on its inner circumference. The lower end of the baffle plate 26 abuts the upper end of the screen plate 18. The upper end of the baffle plate 26 terminates in spaced relationship to the dome plate 14 to permit paper making pulp to flow radially over the baffle plate 26. The baffle plate 26 cooperates with the walls of the casing 10 to define an annular inlet gutter 28 which extends between the inner circumference of a gutter wall 11 and the outer circumference of the baffle plate 26. The inlet gutter 28 communicates with the inlet conduit 16 to receive the paper making pulp introduced into the casing 10 by the inlet conduit 16. A gutter trap conduit 30 communicates with the inlet gutter 28 for discharging from the casing 10 heavy debris contained in the paper making pulp flowing into the inlet gutter 28 from the inlet conduit 16; such heavy debris being thrown against the gutter wall 11 by centrifugal force.

A concave, annular closure plate 32 extends transversely in the casing 10 below the lower end of the screen plate 18. The closure plate 32 provides an annular rejects gutter 34 which receives debris rejected by the screening openings 20 in the screen plate 18. The casing 10 includes a rejects outlet conduit 36, containing a flow control valve designated generally at 38, which communicates with the rejects gutter 34 for conveying from the latter the debris rejected by the screen plate 18.

A cylindrical, imperforate, rotary member or drum 40 is disposed concentrically within the screen plate 18 and the baffle plate 26 and is radially spaced from the plates 18 and 26 to provide a vertically extending, annular fluid flow passage 42 between the latter mentioned plates and the rotary member 40. The outer circumference of the portion 44 of the rotary member 40 which opposes the apertures 20 in the screen plate 18 includes a plurality of spaced, surface deformations which, in the illustrated embodiments of the invention, are formed in the configuration of offset portions or hemispherical protrusions 46 and 47 projecting into the fluid flow passage 42. The protrusions 47, as will later herein be more specifically described, are particularly arranged to provide paper making pulp flowing in the fluid flow passage 42 with a substantially constant axial or tangential velocity relative to the rotary member 40. The portion 48 of the rotary member 40 which commences at the upper end of the screen plate 18 and extends vertically thereabove is formed with a smooth, regular outer circumference.

The rotary member 40 is mounted upon a vertically extending, rotary shaft 50 by a radially extending spider 52 which is formed integrally with the rotary member 40 and includes a hub 54 carried by the rotary shaft 50. The spider 52 is detachably secured to the rotary shaft 50 by a mounting nut 56 which is threaded to the threaded upper end 58 of the rotary shaft 50. The rotary shaft 50 extends through a vertically extending, bearing pedestal 60 containing two vertically spaced sets of bearings (not shown) which support and rotatably journal the rotary shaft 50. The lower end of the rotary shaft 50 extends below the bearing pedestal 60 into the base 12 and carries a pulley 62 within the base 12. The rotary shaft 50 is rotatably driven by an electrically operated motor 64 carried by the base 12 though a driving shaft 66 rotatable by the electrically operated motor 64, a pulley 68 carried by the driving shaft 66, and an endless driving belt 70 longitudinally connecting the pulleys 62 and 68.

The upper end of the rotary member 40 is closed by a substantially horizontal closure plate 72 to seal the interior of the rotary member 40 from paper making pulp flowing from the inlet gutter 28. The rotary member 40 extends above the baffle plate 26 a distance sufficient that, as shown by the arrows in FIG. 1, paper making pulp flowing downwardly onto the closure plate 72 is deflected by the latter into the inlet gutter 28 without interfering with the flow of paper making pulp entering the fluid flow passage 42 in a direction substantially tangential to the rotary member 40.

The beforedescribed construction has been found to provide the paper making pulp screened by the screening apparatus with a substantially constant, tangential velocity relative to the rotary member 40 at the upper end of the screen plate 18 and to greatly increase the screening efficiency of the upper end of the screen plate 18.

A dilution conduit 76, operatively connected to a source (not shown) of dilution fluid to receive dilution fluid from such source, is provided for injecting dilution fluid into the paper making pulp in the fluid flow passage 42. This injection of dilution fluid is disclosed in U.S. patent application Ser. No. 516,537, filed Dec. 27, 1965, by Ian J. H. Clarke-Pounder and, per se, forms no part of the present invention. The dilution conduit 76 contains a flow control valve designated generally as 78 and includes a nozzle or outlet 80 positioned in the screen plate 18 for discharging the dilution fluid into the fluid flow passage 42.

This injection of dilution fluid into the paper making pulp is, of course, highly beneficial, particularly in secondary and tertiary screening steps, for preventing plugging of the screen plate 18 and otherwise increasing the operating efficiency of the latter. This injection of dilution fluid can, however, slow the tangential velocity of the paper making pulp relative to the rotary member 40 and, resultantly, decrease the screening efficiency of the screening apparatus for the reasons previously herein pointed out.

To prevent this decrease in the axial or tangential velocity of the paper making pulp, the protrusions 47 disposed on the rotary member 40 immediately above the nozzle 80 are constructed substantially larger than the protrusions 46 on the rotary member 40. The protrusions 47 are suitably disposed on the rotary member 40 such that, during the rotation of the rotary member 40, they sufficiently increase the tangential velocity of the paper making pulp to provide the paper making pulp, after its dilution by the dilution fluid, with a resultant tangential velocity substantially that of the paper making pulp between the upper end of the screen plate 18 and the rotary member 40. Thus, the tangential velocity of the paper making pulp after its dilution by the dilution fluid is maintained at a value sufficient to prevent such dilution from slowing the paper making pulp such as would increase the time period afforded debris therein to align with the screening openings 20. Although the beforedescribed protrusions 47 are illustrated in FIG. 1 as being of larger size than the other protrusions 46 upon the rotary member 40, it will be understood that, alternatively, all of the protrusions 46 and 47 could be of equal size if they be sufficiently spaced upon the rotary member 40.

The lower ends of the screen plate 18 and the rotary member 40 are relatively arranged to maintain the tangential velocity of the paper making pulp flowing adjacent the screening openings 20 in the screen plate 18 and prevent the beforedescribed waterfall effect from interfering with the screening efficiency of the screen plate 18. More specifically, the rotary member 40 is constructed with a depending, cylindrical skirt 82 which is disposed below the screening openings 20 in the screen plate 18 and includes an integral, outwardly extending, arcuately contoured, deflector portion 84 at its lower end. The skirt 82, including the deflector portion 84, is formed with an imperforate, smooth outer surface. The screen plate 18 is constructed with an integral, depending, cylindrical, baffle plate 86 which extends along the skirt 82 and terminates in spaced relationship to the deflector portion 84 of the latter. The baffle plate 86 is formed with an imperforate, smooth inner circumference. The length of the plate 86, by way of specific example, is, preferably, at least of a ratio of 2 to 1 relative to the radial width of the fluid flow passage 42. Due to the foregoing construction, the waterfall effect occurring as the paper making pulp and debris in the fluid flow passage 42 passes into the rejects gutter 34 is transferred downstream of the screening openings 20 in the screen plate 18 and has no substantial effect on the efficiency of the screening openings 20 in the lower end of the latter.

In the operation of the beforedescribed screening apparatus, the rotary member 40 is rotated continuously by the electrically operated motor 64 through the driving shaft 66, the pulleys 62 and 68, and the endless driving belt 70. Paper making pulp containing debris is introduced into the inlet gutter 28 through the inlet conduit 16 and flows in the inlet gutter 28 circumferentially around the baffle plate 26. During this flow of the paper making pulp, heavy debris contained therein is thrown to the gutter wall 11 by centrifugal force and subsequently passes from the pressurized casing 10 through the gutter trap conduit 30. The paper making pulp, thus freed from its heavy debris, passes radially inward over the baffle plate 26.

A portion of this inwardly flowing paper making pulp passes into the fluid flow passage 42; another portion of this inwardly flowing paper making pulp engages the closure plate 72 of the rotary member 40. This latter portion of the paper making pulp, due to the extension of the rotary member 40 above the baffle plate 26, is deflected by the closure plate 72 back into the inlet gutter 28. This latter portion of the pulp is thus prevented from flowing directly into the fluid flow passage 42 and from interfering with the flow of the portion of the paper making pulp entering the fluid flow passage 42.

The portion of the paper making pulp flowing directly into the fluid flow passage 42 immediately passes between the baffle plate 26 and the portion 48 of the rotary member 40. While there disposed, this portion of the paper making pulp is sufficiently rotated by the rotary member 40 that it attains its screening velocity. Thus, the paper making pulp entering the fluid flow passage 42 is brought to its screening velocity by the rotary member 40 prior to its passage along the screening openings 20 in the screen plate 18. This prerotation of the paper making pulp has been found to greatly increase the screening efficiency of the inlet or upper end of the screen plate 18.

The paper making pulp thus brought to its screening velocity subsequently passes along the screen plate 18 and is screened thereby. During this screening operation, the fiber suitable for the paper making process passes through the screening openings 20 in the screen plate 18 into the accepts chamber 22 and is discharged through the accepts outlet conduit 24. The paper making pulp initially rejected by the screening openings 20, and the debris, continue to flow in the fluid flow passage 42 along the screen plate 18. Immediately prior to its dilution by dilution fluid from the dilution conduit 76, this latter paper making pulp is sufficiently accelerated by the protrusions 47 on the rotary member 40 such that its resultant velocity after dilution is substantially that of the paper making pulp in the fluid flow passage 42 at the upper end of the screen plate 18. Thus, the flow of dilution fluid from the dilution conduit 76 is prevented from slowing the velocity of the paper making pulp.

Subsequently, the debris completely rejected by the screen plate 18 passes below the lower end of the screen plate 18 and is discharged into the rejects gutter 34. Due to the baffle plate 86 extension of the screen plate 18 and the cooperating skirt 82 on the rotary member 40, the waterfall effect resulting from this discharge occurs downstream of the screening openings 20 in the screen plate 18. Thus, this waterfall effect has no significant effect upon the paper making pulp adjacent the screening openings 20; and the axial or tangential velocity of the paper making pulp adjacent the screening openings 20 in the lower end of the screen plate 18 is maintained.

Figure 2:
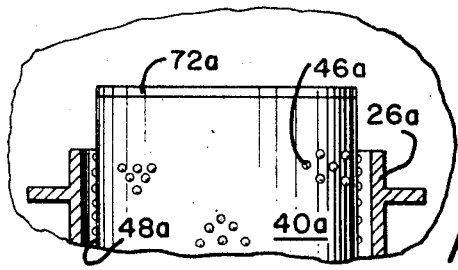
FIG. 2 is a fragmentary, elevational view of an alternative form of the inlet end of the fluid passage provided between the screen plate and the rotary working member.
Figure 3:
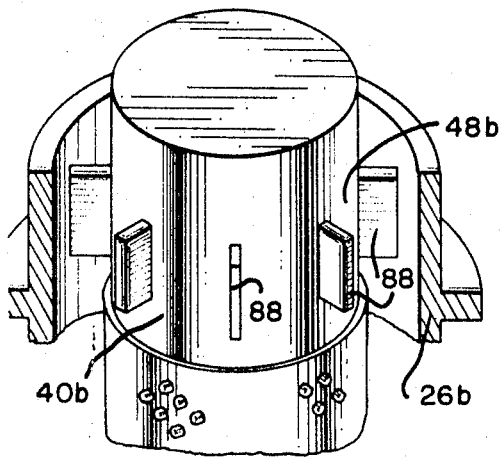
FIG. 3 is a fragmentary, perspective view illustrating another alternative form of the inlet end of the fluid passage.
Figure 4:
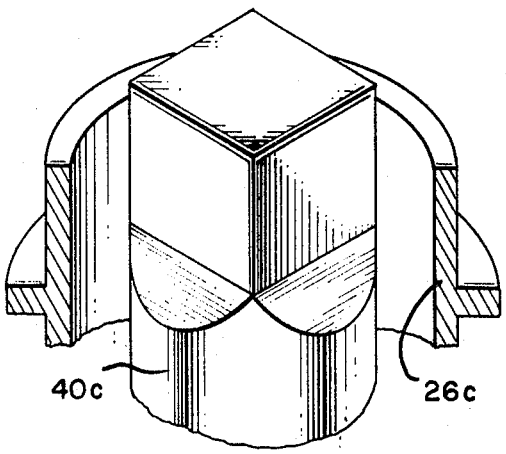
FIG. 4 is a fragmentary, perspective view illustrating another alternative form of the inlet end of the fluid passage.

FIGS. 2, 3, and 4 illustrate alternative configurations of the upper end of the rotary member 40 which are suitable for substitution for the portion 48 of the rotary member 40 illustrated in FIG. 1. As shown in FIG. 2, the protrusions 46a on the rotary member 40a are continued on the portion 48a of the latter opposite the baffle plate 26a. As shown in FIG. 3, a plurality of radially extending paddles 88 are carried by the portion 48b of the rotary member 40b opposite the baffle plate 26b. As shown in FIG. 4, the upper end of the rotary member 40c is contoured with a square cross section which commences opposite the baffle plate 26c and extends vertically thereabove. The outer periphery of the squared upper end of the rotary member 40c is a smooth, regular surface.

Figure 5:
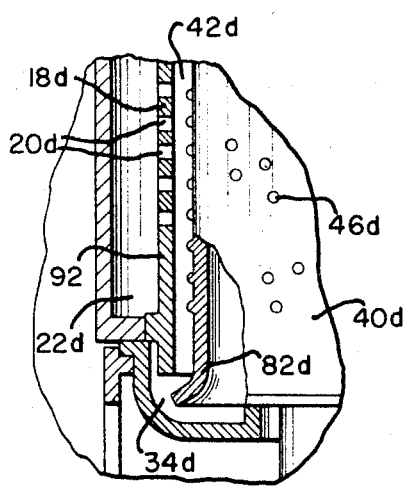
FIG. 5 is a fragmentary, elevational view of an alternative form of the discharge end of the fluid passage.

FIG. 5 illustrates an alternative configuration of the lower ends of the rotary member 40 and the screen plate 18. As shown therein, the rotary member 40d carries a plurality of spaced protrusions 46d and includes a skirt 82d substantially similar to that shown in FIG. 1. The screen plate 18d includes a plurality of openings 20d which communicate the fluid flow passage 42d with the accepts chamber 22d. The screen plate 18d, furthermore, includes an integral, imperforate, baffle plate 92 at its lower end which is bounded by the fluid flow passage 42d and the accepts chamber 22d. The baffle plate 92, similarly to the baffle plate 86 shown in FIG. 1 and previously hereindescribed, prevents the waterfall effect of paper making pulp and debris discharging into the rejects gutter 34d from interfering with the screening operation of the screening openings 20d.

The operation of the embodiments of the invention shown in FIGS. 2 through 5 is generally similar to that of FIG. 1 and is believed to be apparent from the foregoing description.

Having thus described my invention, I claim:

1. An apparatus for screening pulp to separate acceptable fiber from the debris, comprising an annular screen having openings adapted for accepting acceptable fiber and rejecting debris, an annular baffle at one end of said screen and cooperating with said screen to bound one side of an annular fluid passage, a wall member arranged on an axis generally parallel to the axis of said screen and extending circumferentially along said screen and baffle in spaced relation thereto bounding the opposing side of said annular fluid passage, said wall member being mounted for driven rotation about its said axis and including an end portion substantially projecting beyond said baffle and beyond the thereadjacent end of said annular fluid passage, closure means carried by said wall member transversely to said axis thereof for preventing pulp flow into said end portion, said substantial projection of said end portion being sufficient that pulp directed onto said closure means is deflected outside of said annular fluid passage, inlet means communicating with said annular fluid passage for supplying pulp to said fluid passage between said baffle and said wall member, said baffle and wall member being opposed along said annular fluid passage a substantial distance predetermined as sufficient that pulp supplied by said inlet means is rotated by said wall member to a velocity desirable for screening while between said baffle and wall member and prior to passing between said screen and wall member, accepts outlet means for discharging acceptable fiber accepted by said openings in said screen, and rejects outlet means communicating with said annular fluid passage for discharging debris rejected by said openings in said screen.

2. A screening apparatus according to claim 1, further comprising said baffle being imperforate and said wall member including an irregular surface opposite said screen.

3. A screening apparatus according to claim 2, wherein said baffle includes a regular, substantially smooth surface opposite said wall member.

4. A screening apparatus according to claim 2, wherein said wall member includes a regular, substantially smooth surface opposite said baffle.

5. A screening apparatus according to claim 2, wherein said wall member includes an irregular surface opposite said baffle.

6. A screening apparatus according to claim 2, wherein said wall member carries a plurality of paddle blades opposite said baffle.

7. A screening apparatus according to claim 2, wherein said wall member is formed of polygonal configuration opposite said baffle.

8. A screening apparatus according to claim 2, wherein said wall member includes a plurality of spaced protrusion opposite said baffle.

9. A screening apparatus according to claim 2, wherein said screen and said wall member are vertically disposed, said baffle projects vertically above the upper end of said screen, and said wall member extends vertically above the upper end of said baffle.

10. A screening apparatus according to claim 2, wherein said rejects outlet means communicates with said fluid passage adjacent the end of said screen opposite to that adjacent said baffle, and a second baffle projects beyond said opposite end of said screen and forms a longitudinal extension of said screen adjacent the communication of said rejects outlet means with said fluid passage.

11. A screening apparatus according to claim 10, wherein said second baffle is imperforate.

12. A screening apparatus according to claim 11, wherein said second baffle is of a length at least twice the width of said fluid passage.

13. A screening apparatus according to claim 11, wherein said wall member projects beyond said second baffle for deflecting debris rejected by said screen towards said rejects outlet means.

14. A screening apparatus according to claim 13, wherein said screen and said wall member are vertically disposed, said baffle projects vertically above the upper end of said screen, said second baffle projects vertically below the lower end of said screen, and said wall member extends vertically above said baffle and vertically below said second baffle.

15. A screening apparatus according to claim 2, wherein a fluid conduit means extends through said screen for introducing dilution fluid into said fluid passage, and said irregular surface of said wall member opposite said screen is formed to increase the velocity of the pulp flowing through said fluid passage immediately prior to the introduction into said fluid passage of said dilution fluid.

16. A screening apparatus according to claim 15, wherein said irregular surface of said wall member is formed to increase the velocity of the pulp flowing in said fluid passage sufficiently that the velocity of said pulp, after dilution, is substantially that thereof adjacent said one end of said screen.

References Cited

UNITED STATES PATENTS

| 811,930 | 2/1906 | Kihlgren | 209—300 X |
| 3,363,759 | 11/1968 | Clarke-Pounder | 209—379 X |
| 1,559,528 | 10/1925 | Stub | 209—300 X |
| 1,840,917 | 1/1932 | Ross | 209—358 X |
| 1,856,176 | 5/1932 | Trimbey | 209—273 |

FOREIGN PATENTS

| 115,639 | 1/1946 | Sweden. |
| 380,283 | 4/1922 | Germany. |
| 707,926 | 5/1941 | Germany. |
| 336,252 | 10/1930 | Great Britain. |

HARRY B. THORNTON, Primary Examiner

R. HALPER, Assistant Examiner

U.S. Cl. X.R.

209—273, 306, 358